(12) United States Patent
Soles et al.

(10) Patent No.: US 9,630,467 B2
(45) Date of Patent: Apr. 25, 2017

(54) LEAF SPRING ASSEMBLY

(71) Applicant: GM GLOBAL TECHNOLOGY OPERATIONS LLC, Detroit, MI (US)

(72) Inventors: Peter J. Soles, Tecumseh (CA); Jian Chen, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/682,379

(22) Filed: Apr. 9, 2015

(65) Prior Publication Data

US 2016/0297270 A1    Oct. 13, 2016

(51) Int. Cl.
*B60G 11/12* (2006.01)
*B60G 11/10* (2006.01)

(52) U.S. Cl.
CPC ............ *B60G 11/12* (2013.01); *B60G 11/10* (2013.01); *B60G 2204/121* (2013.01); *B60G 2206/428* (2013.01); *B60G 2206/82* (2013.01)

(58) Field of Classification Search
CPC ........ F16F 1/3686; F16F 1/3683; F16F 1/368; B60G 11/12; B60G 11/10; B60G 2206/82; B60G 2206/428; B60G 2204/121
USPC .................................... 267/260, 30, 36.1, 47
See application file for complete search history.

(56) References Cited

U.S. PATENT DOCUMENTS

| | | | | |
|---|---|---|---|---|
| 4,562,998 A * | 1/1986 | Ward | ................... | B60G 11/113 267/148 |
| 4,696,459 A * | 9/1987 | Woltron | ................ | B60G 11/12 267/149 |
| 4,762,307 A * | 8/1988 | Woltron | ................... | B29C 70/86 267/158 |
| 4,771,997 A * | 9/1988 | Haldenwanger | ...... | F16F 1/3686 267/149 |
| 4,988,080 A * | 1/1991 | Shah | ........................ | B60G 7/04 267/30 |
| 2008/0252033 A1* | 10/2008 | Platner | ................... | B60G 11/10 280/124.163 |
| 2014/0042680 A1* | 2/2014 | Glover | .................... | F16F 1/368 267/158 |

(Continued)

FOREIGN PATENT DOCUMENTS

DE    EP 0405307 A1 *    1/1991    ............. B60G 11/12

OTHER PUBLICATIONS

Machine Translation in English for EP0405307A1, Inventor: Leonhard et al., 2 pages; Retrieve Date: Apr. 6, 2016.*

*Primary Examiner* — Thomas J Williams
*Assistant Examiner* — Mariano Sy
(74) *Attorney, Agent, or Firm* — Cantor Colburn LLP

(57) ABSTRACT

A leaf spring assembly comprises a leaf spring having an axially extending member, an axis, a key portion disposed at an end thereof, first and second parallel elongate members extending radially from the attachment ring along an axis and include inner facing surfaces opposing one another along the axis to define a receiving slot that is configured to receive the end of the leaf spring. The leaf spring is joined with the leaf spring eye and a key slot, formed adjacent to a terminal end of the receiving slot and comprising an enlarged slot portion defined by a first shoulder formed in an inner facing surface of an elongate member and configured to receive the key portion disposed at the end of the axially extending member.

18 Claims, 4 Drawing Sheets

(56) References Cited

U.S. PATENT DOCUMENTS

2014/0167339 A1* 6/2014 Wagner .................. B60G 11/08
267/260
2015/0267377 A1* 9/2015 Whipple ................. E02F 3/962
37/266

* cited by examiner

LEAF SPRING ASSEMBLY

FIELD OF THE INVENTION

The subject of the invention is related to suspension systems for motor vehicles and, more particularly, to an attachment system for joining a spring eye to a composite leaf spring.

BACKGROUND

Various types of springs are used in vehicle suspension systems to absorb shock during vehicle travel. Single steel leaf springs have a high modulus of elasticity and are typically too stiff for automotive applications. Multi-layered steel leaf springs have been introduced to reduce stiffness and have been used in automotive applications. Single steel leaf springs and multi-layered steel leaf springs can be challenging for automotive use due to weight constraints. Consequently, manufacturers look to composite materials for weight reduction. Although composite leaf springs offer significant weight reduction over their steel counterparts, the softness of composite materials presents difficulty for reliable attachment of the leaf spring to a leaf spring eye and, subsequently, to a vehicle chassis. Additional attachment materials such as epoxies increase material costs and add additional steps to the attachment process. Accordingly, it is desirable to provide an integrated spring eye locking mechanism.

SUMMARY OF THE INVENTION

In an exemplary embodiment a leaf spring assembly comprises a leaf spring comprising an axially extending rod, leaf, or axially extending flat member having an axis and a key portion disposed at an end thereof; a leaf spring eye comprising an attachment ring; first and second parallel elongate members extending radially from the attachment ring along an axis and include inner facing surfaces opposing one another along the axis to define a receiving slot that is configured to receive the end of the leaf spring therein when the leaf spring is joined with the leaf spring eye; and a key slot formed adjacent to a terminal end of the receiving slot and comprising an enlarged slot portion defined by a first shoulder formed in an inner facing surface of an elongate member and configured to receive the key portion disposed at the end of the axially extending rod or axially extending flat member when the leaf spring is joined with the leaf spring eye.

In another exemplary embodiment of the invention, a vehicle having a leaf spring assembly comprises a leaf spring comprising an axially extending member having an axis and a key portion disposed at an end thereof, first and second parallel elongate members extending radially from the attachment ring along an axis and include inner facing surfaces opposing one another along the axis to define a receiving slot that is configured to receive the end of the leaf spring therein when the leaf spring is joined with the leaf spring eye; and a key slot formed adjacent to a terminal end of the receiving slot and comprising an enlarged slot portion defined by a first shoulder formed in an inner facing surface of an elongate member and configured to receive the key portion, disposed at the end of the axially extending rod, leaf, or axially extending flat member, when the leaf spring is joined with the leaf spring eye.

In another exemplary embodiment of the invention, a method of assembling a leaf spring and a leaf spring eye, the method comprises laterally receiving an end of the leaf spring through a receiving slot of the leaf spring eye, the leaf spring having an axially extending rod, leaf, or axially extending flat member with an axis and a key portion disposed at the end of the leaf spring, the leaf spring eye comprising first and second parallel elongate members extending radially from an attachment ring of the leaf spring eye along the axis, a first shoulder formed in an inner facing surface of an elongate member defines the receiving slot, and securing the leaf spring to the leaf spring eye with a threaded fastener that extends through the leaf spring and the leaf spring eye.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
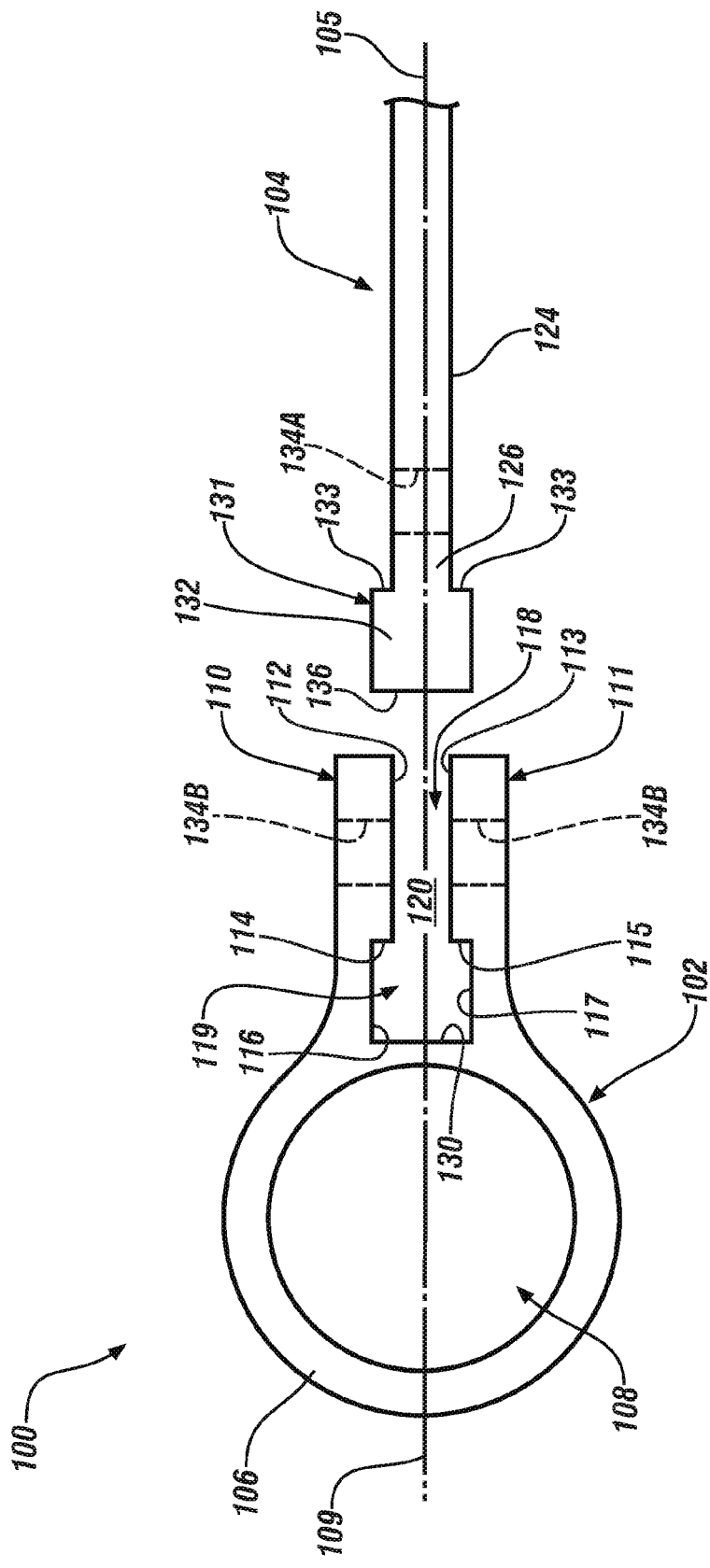
FIG. 1 illustrates a view of a leaf spring eye and leaf spring in accordance with one exemplary embodiment of the invention.

The following description is merely exemplary in nature and is not intended to limit the present disclosure, its application or uses. As used herein, the term "vehicle" is not limited to just an automobile, truck, or sport utility vehicle, but includes any self-propelled or towed conveyance suitable for transporting a burden.

Referring to FIGS. 1-5, a leaf spring assembly 100 comprises a leaf spring eye 102 and a leaf spring 104. The leaf spring eye 102 acts as an attachment point to a vehicle chassis, frame, or other rigid vehicle component 103. The leaf spring assembly 100 typically attaches to a movable part or parts of the vehicle that would otherwise introduce a disturbance to the vehicle chassis 103 of the vehicle 400 (i.e. wheel and suspension assembly (not shown)).

The leaf spring 104 comprises an axially extending rod, leaf, or axially extending flat member 124 having a leaf spring axis 105 extending the length thereof and a key portion 131 disposed at an end 126 thereof. The key portion 131 has, in an exemplary embodiment, an enlarged head 132 defined by shoulders 133. A fastener opening 134A may extend through a portion of the axially extending rod, leaf, or axially extending flat member 124 for receipt of a threaded fastener, to be described in further detail herein. The leaf spring 104 is constructed of a composite material, such as epoxy reinforced with e-glass fibers. In another embodiment, the leaf spring 104 may be formed of other materials such as light weight metal alloys having suitable performance characteristics.

The leaf spring eye 102 may include an attachment ring 106 that defines an opening 108 for attachment to vehicle chassis 103. A fastener 138 extends through the opening 108 to attach the leaf spring eye 102 to the vehicle chassis 103. In this embodiment, the leaf spring eye 102 is made of aluminum. In the embodiment illustrated, the attachment ring 106 defines a round opening, but other shapes including an oval or rectangular shape are contemplated by this disclosure. First elongate member 110 and second elongate member 111 extend radially from the attachment ring 106. The first elongate member 110 and second elongate member 111 extend substantially parallel to one another along an axis 109. First elongate member 110 includes a first inner facing surface 112 and second elongate member 111 includes a second inner facing surface 113. The first inner facing surface 112 and second inner facing surface 113 oppose one another along axis 109, to define a receiving slot 118 that is configured to laterally receive the end 126 of the leaf spring 104 therein. A fastener opening 134B may extend through the first elongate member 110 and second elongate member 111 for receipt of a threaded fastener, to be described in further detail herein.

A key slot 119 is formed adjacent to the terminal end 130 of the receiving slot 118. The key slot 119 comprises an enlarged slot portion defined by a first shoulder 114, a second shoulder 115, a first wall 116, a second wall 117, and the terminal end 130. The first shoulder 114 is formed in the inner facing surface 112 of the first elongate member 110. The first shoulder 114 extends between and is disposed substantially perpendicular to the inner facing surface 112 and the first wall 116. The second shoulder 115 is formed in the inner facing surface 113 of the second elongate member 111. The second shoulder 115 extends between and is disposed substantially perpendicular to the inner facing surface 113 and the second wall 117. The terminal end 130 is configured as a wall that extends between and is disposed substantially perpendicular to the first wall 116 and the second wall 116. The terminal end 130 is disposed substantially parallel to an end surface 136 of the key portion 131. The key slot 119 is configured to laterally receive the key portion 131 of the leaf spring 104 and the end surface 136 of the key portion 131 abuts the terminal end 130 when the leaf spring 104 is joined with the leaf spring eye 102.

Figure 2:
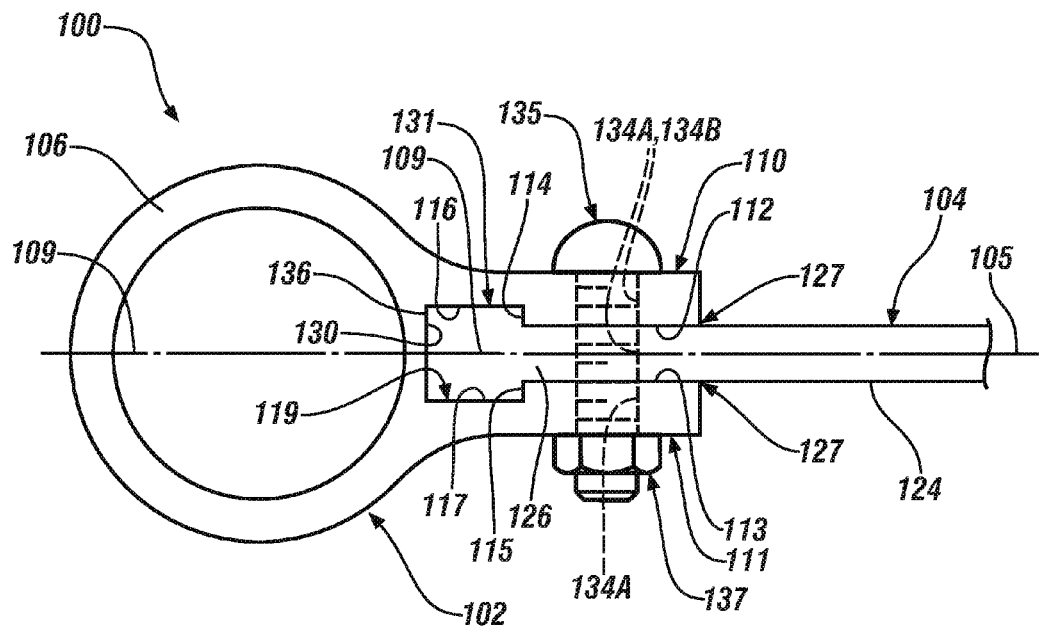
FIG. 2 illustrates a view of the assembled leaf spring eye and leaf spring of FIG. 1.
Figure 4:
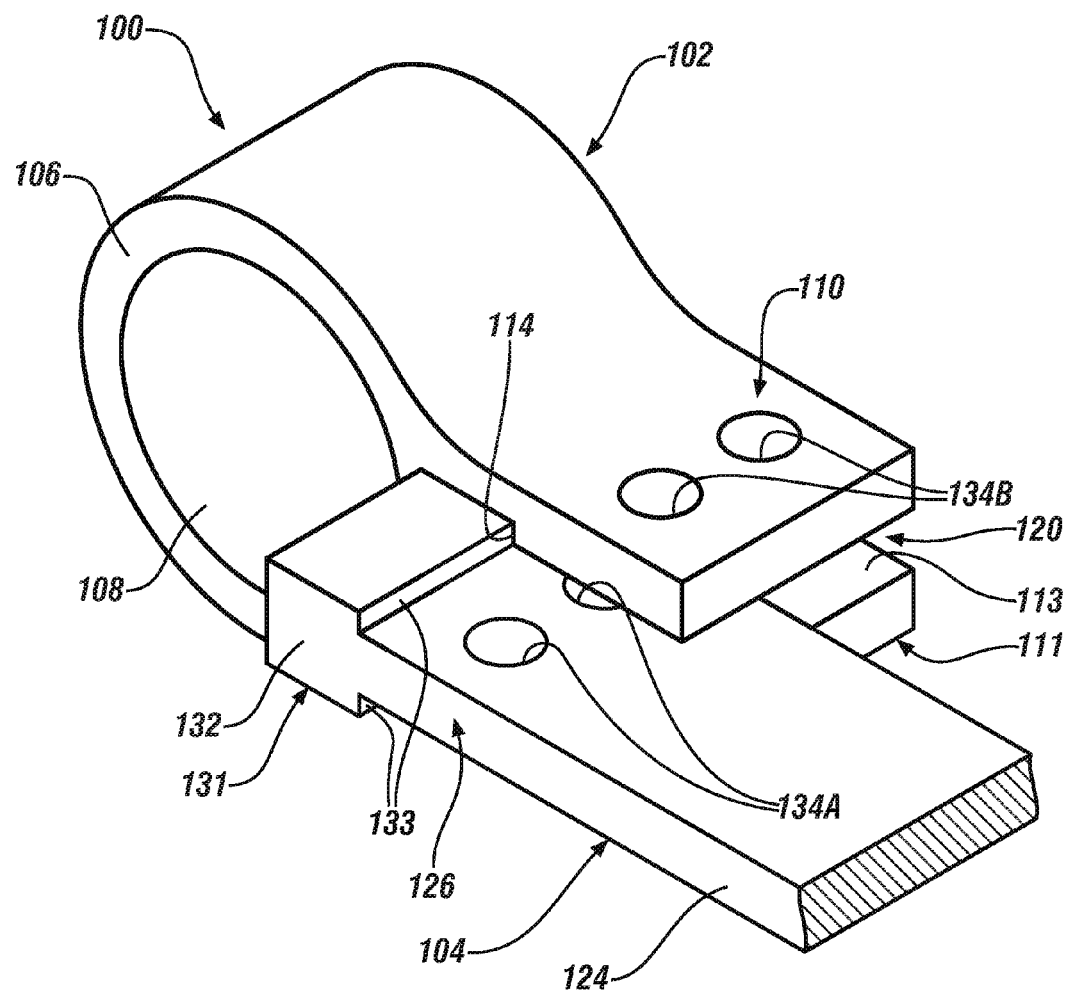
FIG. 4 illustrates a view of a partially assembled leaf spring eye and leaf spring in accordance with the exemplary embodiment of the invention.
Figure 5:
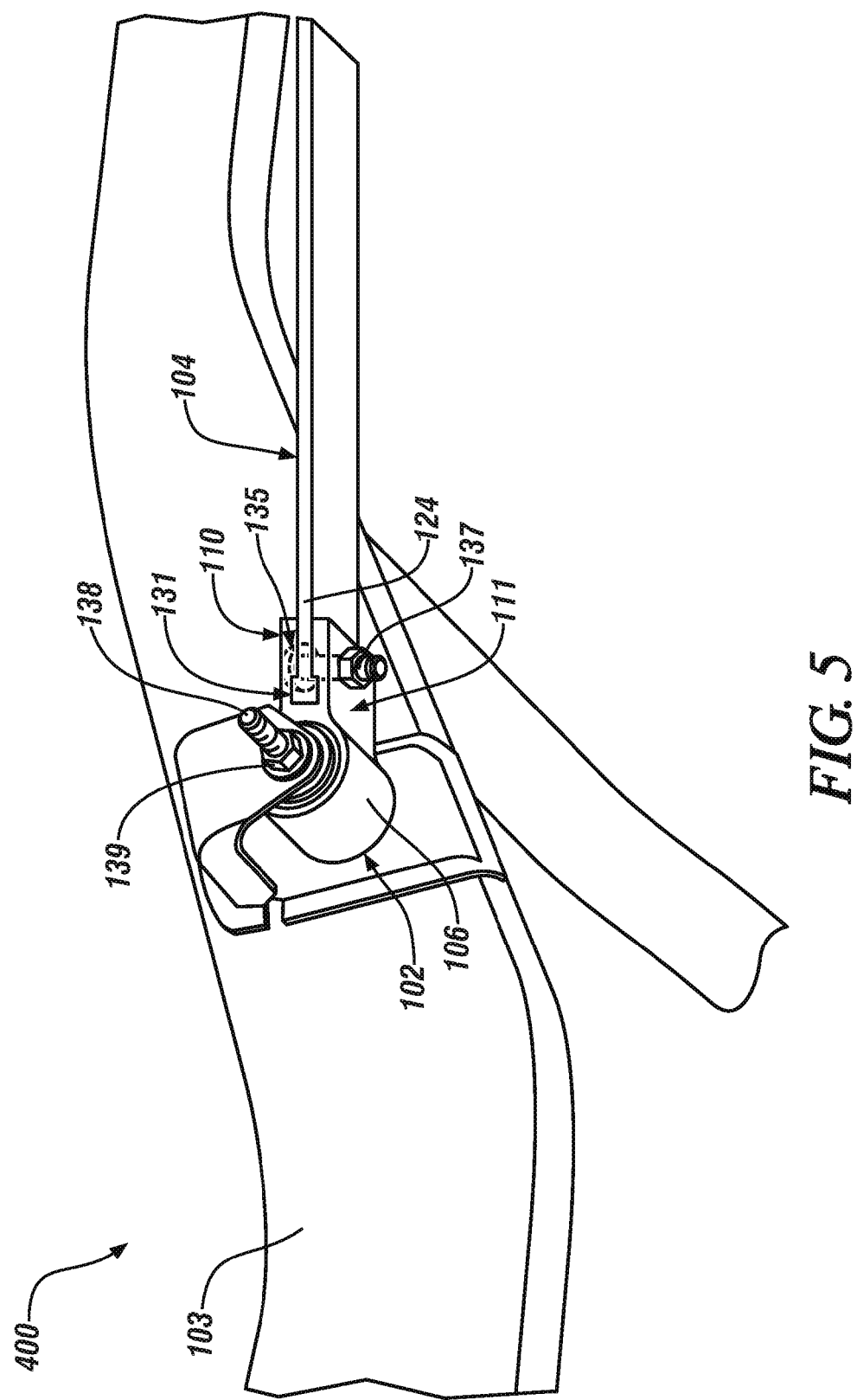
FIG. 5 illustrates a view of the assembled leaf spring eye and leaf spring attached to a vehicle chassis.

Referring to FIGS. 2 and 4, with continuing reference to FIGS. 1 and 5, the leaf spring 104 is assembled to the leaf spring eye 102 through lateral insertion of the end 126 of the axially extending rod into the lateral entrance 120. The lateral entrance 120 is defined by the receiving slot 118, which is defined between the first elongate member 110, second elongate member 111 and the key slot 119 at the terminal end 130 of the leaf spring 104. Once properly inserted into the receiving slot 118, the leaf spring axis 105 aligns with the axis 109 defined by the first elongate member 110 and second elongate member 111, resulting in alignment of the fastener opening 134A of the leaf spring 104 and fastener opening 134B formed in the first elongate member 110 and second elongate member 111. A fastener 135 such as a through-bolt or other suitable fastener extends through the aligned openings and is secured with a nut 137. Other suitable fasteners may be used.

The positioning of the key portion 131 in the key slot 119 prevents translational motion in the axial direction 105/109. Specifically, the first shoulder 114, second shoulder 115 and terminal end 130 counteract forces acting along the axis of the axially extending rod or axially extending flat member 124 to thereby arrest translational motion in the axial direction. As such, tightening of the fastener 135 may be kept to a minimum (i.e. that required to restrict lateral movement between the components) so as to reduce stress on the end 126 of the axially extending rod, leaf, or axially extending flat member 124 of the leaf spring 104 that would otherwise result in compressive forces detrimental to the leaf spring material.

In an embodiment, to further avoid translational motion of the axially extending rod, leaf, or axially extending flat member 124 in the axial direction, the first inner facing surface 112 of the first elongate member 110, and the second inner facing surface 113 of the second elongate member 111, may include a coarse or roughened pattern to increase the frictional resistance to any motion of the leaf spring 104 after installation.

In another embodiment, the leading edges 127 of first elongate member 110 and second elongate member 111 can be chamfered or rounded to prevent wear on the axially extending rod or axially extending flat member 124 caused by bending of the leaf spring 104 during operation.

Figure 3:
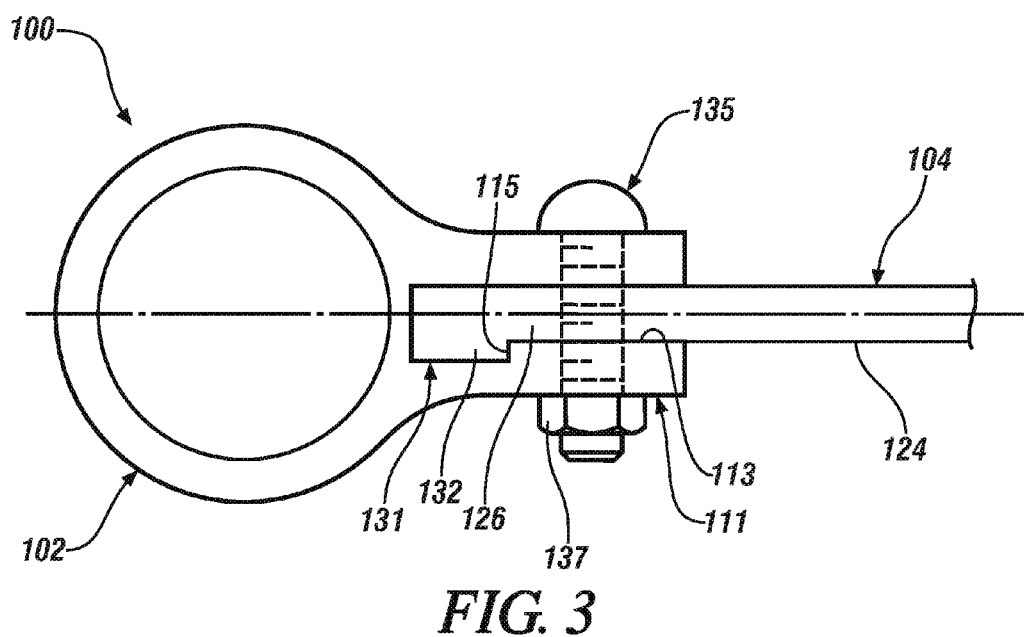
FIG. 3 illustrates a view of an assembled leaf spring eye and leaf spring in accordance with another exemplary embodiment of the invention.

Referring to FIG. 3, an alternative embodiment of the leaf spring assembly 100 embodying the invention is illustrated. In the embodiment of FIG. 3, the key portion 131 of the enlarged head 132 that is formed on the end 126 of the axially extending rod, leaf, or axially extending flat member 124 of the leaf spring 104 is configured to engage only a second shoulder 115 on the second inner facing surface 113 of the second elongate member 111. The embodiment simplifies the configuration of both the leaf spring 104 and leaf spring eye 102 and avoids errors in assembly of the components by providing for assembly in only one orientation.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A leaf spring assembly comprising:
   a leaf spring comprising an axially extending member having an axis and a key portion disposed at an end thereof;
   a leaf spring eye comprising an attachment ring;
   first and second parallel elongate members extending radially from the attachment ring along an axis and include inner facing surfaces opposing one another along the axis to define a receiving slot that is configured to receive the end of the leaf spring therein when the leaf spring is joined with the leaf spring eye; and
   a key slot formed at an end of the receiving slot and comprising an enlarged slot portion defined by terminal end, a first shoulder that extends between an inner facing surface and a first wall of the first elongate member and configured to receive the key portion, disposed at the end of the axially extending member.

2. The leaf spring assembly of claim 1, the key portion comprising an enlarged head defined by a shoulder extending from the axially extending member at the end thereof.

3. The leaf spring assembly of claim 2, the first shoulder and terminal end operable to counteract forces acting along the axis of the axially extending member to arrest translational motion in the axial direction.

4. The leaf spring assembly of claim 1, the inner facing surfaces comprising a coarse or roughened pattern.

5. The leaf spring assembly of claim 1, the first and second parallel elongate members having chamfered or rounded leading edges adjacent the receiving slot.

6. The leaf spring assembly of claim 1, the receiving slot and the key slot defining a lateral entrance for the axially extending member and the key portion.

7. The leaf spring assembly of claim 1, further comprising aligned fastener openings extending through the first and second elongate members and the axially extending member for receipt of a fastener, the aligned fastener openings being spaced apart from the key portion and the key slot.

8. The leaf spring assembly of claim 1, wherein the axially extending member is at least one of an axially extending leaf, an axially extending rod, and an axially extending flat member.

9. The leaf spring assembly of claim 1, wherein the first shoulder faces towards and is disposed parallel to the terminal end.

10. A vehicle having a leaf spring assembly comprising:
a leaf spring comprising an axially extending member having an axis and a key portion having an enlarged head defined by shoulders disposed at an end thereof;
a leaf spring eye comprising an attachment ring;
first and second parallel elongate members extending radially from the attachment ring along an axis and include inner facing surfaces opposing one another along the axis to define a receiving slot that is configured to receive the end of the leaf spring therein when the leaf spring is joined with the leaf spring eye; and
a key slot formed adjacent to a terminal end of the receiving slot and comprising an enlarged slot portion defined by a first shoulder that extends between a first inner facing surface and a first wall of the first elongate member, and a second shoulder that extends between a second inner facing surface and a second wall of the second elongate member, and the key slot, being configured to receive the key portion, such that an end surface of the key portion abuts the terminal end.

11. The vehicle of claim 10, the inner facing surfaces comprising a coarse or roughened pattern.

12. The vehicle of claim 10, the first and second parallel elongate members having chamfered or rounded leading edges adjacent the receiving slot.

13. The vehicle of claim 10, the receiving slot and the key slot defining a lateral entrance for the axially extending member and the key portion.

14. The vehicle of claim 10, further comprising aligned fastener openings extending through the first and second elongate members and the axially extending member for receipt of a fastener.

15. The vehicle of claim 10, the first shoulder, the second shoulder, and terminal end configured to counteract forces acting along the axis of the axially extending member to arrest translational motion in the axial direction.

16. The vehicle of claim 10, wherein the axially extending member is constructed from a composite material.

17. The vehicle of claim 10, the axially extending member is at least one of an axially extending leaf, an axially extending rod, and an axially extending flat member.

18. The vehicle of claim 10, wherein the shoulders of the enlarged head are configured to engage the first shoulder and the second shoulder.

* * * * *